July 10, 1951                    J. MIHALYI ET AL                    2,559,892
                            FILM WINDING CONTROL FOR CAMERAS
Filed Sept. 2, 1949                                                2 Sheets-Sheet 1

JOSEPH MIHALYI
CLARENCE W. PRIBUS
HERBERT A. BING
INVENTORS

BY
ATTORNEYS.

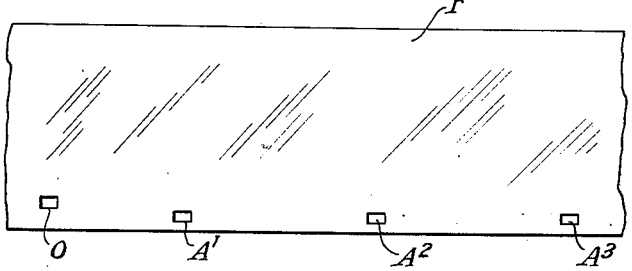
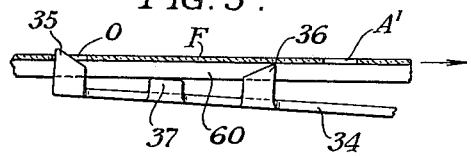
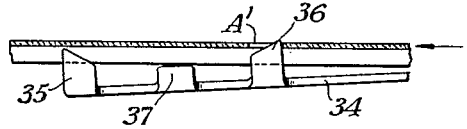
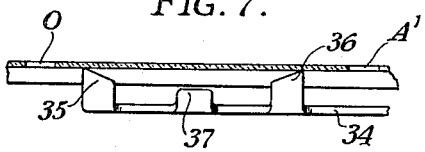
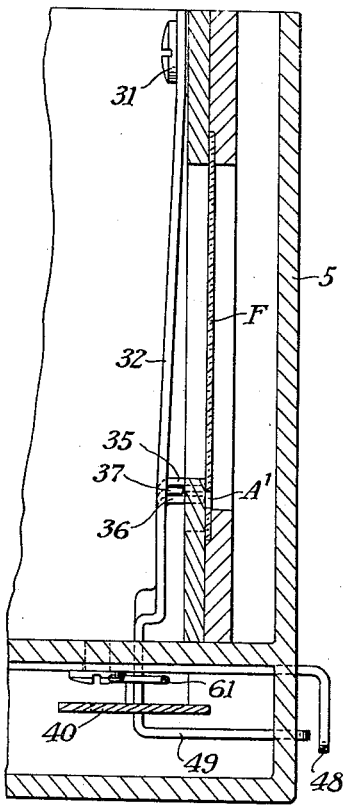
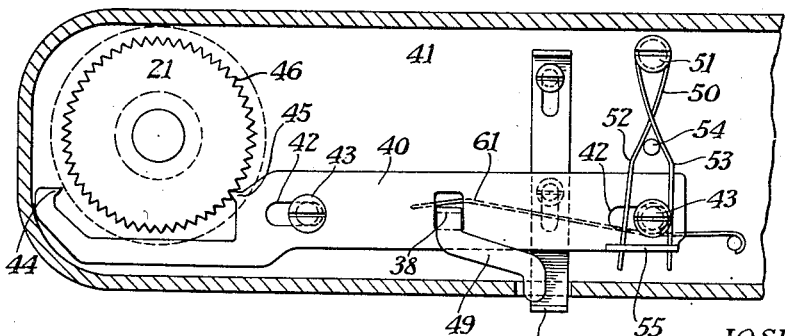

Patented July 10, 1951

2,559,892

UNITED STATES PATENT OFFICE 2,559,892

FILM WINDING CONTROL FOR CAMERAS

Joseph Mihalyi, Clarence W. Pribus, and Herbert A. Bing, Rochester, N. Y., assignors to Eastman Kodak Company, Rochester, N. Y., a corporation of New Jersey Application September 2, 1949, Serial No. 113,862

17 Claims. (Cl. 242—71)

This invention relates to photography and more particularly to a film winding control for photographic cameras. One object of our invention is to provide a film winding control in which movement of the film through a camera may be controlled in two directions; in one direction for making a plurality of exposures, and in an opposite direction for winding a full length of film past an exposure frame. Another object of our invention is to provide a film winding control which will greatly facilitate loading and unloading a camera and moving the film after exposures. A still further object of our invention is to provide a mechanism for cameras in which a film may be inserted, may be fully unwound, and may be wound up one step at a time through the action of a single film winding knob. A still further object of our invention is to provide an automatic control mechanism which will definitely limit the film movement in both directions without attention from the operator except the turning of a single film winding knob. A still further object of our invention is to provide a mechanism which will hold a latching mechanism inactive except when a film is actually passing through the camera and which will facilitate loading film in the camera. Other objects will appear from the following specification, the novel features being particularly pointed out in the claims at the end thereof.

In roll-holding cameras it is customary to load film by placing a film spool in a supply chamber, moving the film and/or backing paper across an exposure frame, attaching it to an empty spool and winding the film from the supply to a take-up chamber. The film is usually removed on a separate film spool. In cameras employing retorts, such as the commonly used 35 mm. film, film is often moved from a retort to a fixed film hub and after attaching to the hub, it may be wound thereon until all the exposures have been made, after which the film is wound back into the original retort to be removed by customer. These known methods are inconvenient, require considerable time, and are susceptible to improper operation unless the film is carefully aligned and carefully attached to the permanent or temporary take-up hub. One of the objects of our present invention is to provide a film control mechanism for cameras so designed that all the operator need do is drop a roll of film over a suitable film support, preferably loading the film cartridge axially into a supply chamber and without attaching the end of the film to any take-up mechanism. The film spool may then be turned until the end of the film engages a guideway which directs the film across an exposure frame and into a loose loop in a film take-up chamber. The film may be totally unwound from the spool until a stop is reached which automatically prevents further unwinding. The film may then be wound back, one exposure area at a time, automatically stopping for each exposure aperture without attention from an operator. If desired, the exposures may be made in unwinding the film and, after fully exposed, it may be rewound on the original spool, although we prefer to provide a structure in which the unwinding operation is accomplished first and the exposures are made as the film is being returned to its spool. In the present invention the spool may be loaded to and from the camera body and may be directed into a guideway in the manner shown in the following two patents: U. S. 2,336,278, Mihalyi, Film Winding Apparatus, December 7, 1943; U. S. 2,367,514, Mihalyi, Exposure Indicating Spool and Camera Support Therefor, January 16, 1945.

Coming now to the drawings wherein like reference characters denote like parts throughout:

Fig. 4 is a fragmentary view of a perforated film adapted for use on a film spool to form a film cartridge suitable for use in my improved form of camera;

Fig. 5 is a fragmentary detail partially in section showing a portion of the film-engaging lever in the position the lever assumes when the film has been completely unwound;

Fig. 6 is a view similar to Fig. 5 but with the lever shown engaging an aperture to position the film for an exposure as the film is being moved in a reverse direction from Fig. 5;

Fig. 7 is a view similar to Figs. 5 and 6, but with the film-engaging lever in an inactive position;

Fig. 8 is a view similar to Fig. 3, but with the latching mechanism in one of its positions to prevent the operation of the film winding knob; and Fig. 9 is an enlarged transverse section through a portion of the camera showing the film engaging and latching lever and a release therefor. This view is taken on line 9—9 of Fig. 2.

My invention comprises broadly providing a winding control mechanism for cameras employing especially perforated film; there being a series of aligned apertures, one for each exposure area, and there being a single stop aperture out of alignment with the aligned apertures. A film-engaging lever, through engagement with these apertures, is arranged to move a short distance with the film, during which time a two-point pawl is moved to engage a ratchet on the winding knob to prevent further movement of the film. Thus, when the camera is loaded and the knob is turned, film may be propelled through the camera until a point near the end of the film is reached, at which point a beveled lug may engage the stop aperture and halt the unwinding of the film. Exposures may then be made one at a time by winding the film back on the original spool; the apertures and a beveled lug causing automatic stoppage of the film winding once for each exposure. After each exposure the latching mechanism may be automatically or manually released to permit winding to the next exposure area.

Figure 1:
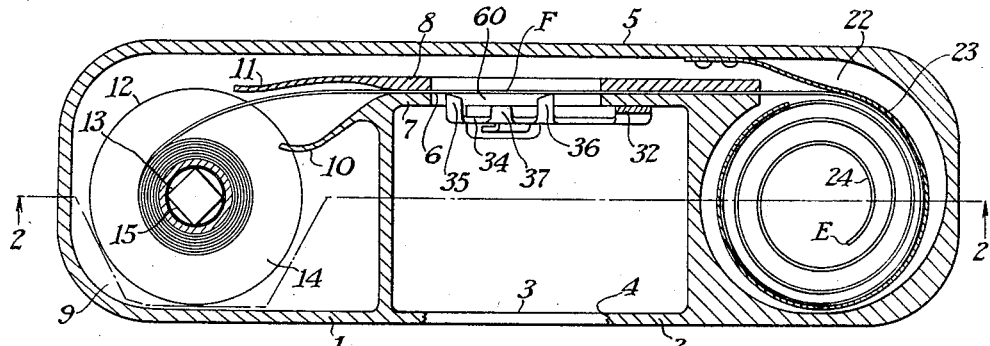
Fig. 1 is a fragmentary top plan view of a camera having a film winding control constructed in accordance with and embodying a preferred form of my invention. In this view the top plate of the camera is removed to expose the interior.

More specifically, a preferred embodiment of our invention is shown in the drawings. In Fig. 1 a camera casing 1 may be employed having a front wall 2 and an aperture 3 threaded at 4 to receive an objective which is preferably mounted in a between-the-lens type of shutter. There is a rear wall 5 to the camera and a film gate 6 is formed between the plates 7 and 8. These plates hold a film "F" flat in the focal plane of the objective. A film supply chamber 9 is provided with guide members 10 and 11 leading up to the film gate 6 and a film cartridge, designated broadly as 12, may be loaded into the supply chamber by placing the hub 13 of a film spool 14 on a shaft 15 which is preferably polygonal in shape and which extends through an inner camera wall 16. The film "F," wound on the film spool 14, constitutes the film cartridge, and the film spool is preferably provided with inwardly extending beads 17 on the flanges of the spool 14 to hold the film against unwinding, and to provide a light-tight joint in a known manner, as shown in U. S. Patent No. 2,336,278. The cartridge is further shown in copending application Serial No. 113,863 filed September 2, 1949, in the name of Joseph Mihalyi.

Figure 3:
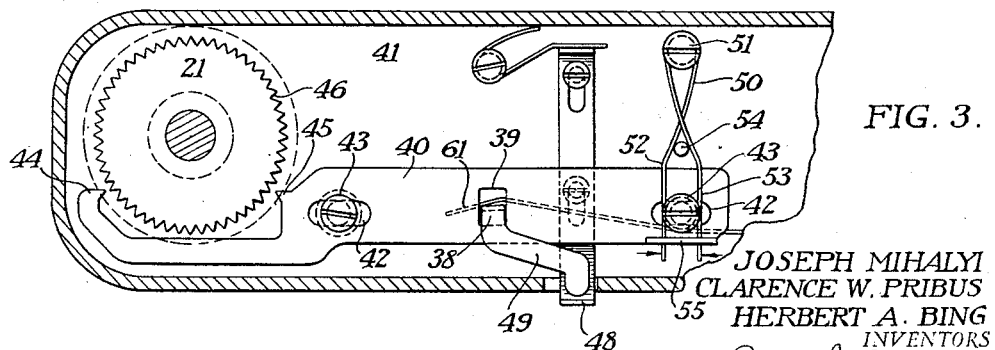
Fig. 3 is a fragmentary bottom plan view with the bottom wall removed showing a portion of the latching structure in elevation.

The film cartridge 14 may be turned by turning a winding knob 18, here shown as being mounted on the bottom wall 19 of the camera. Knob 18 is mounted on a shaft 20 and carries a ratchet 21 having symmetrical teeth, as shown in Fig. 3, so that the knob 18, shaft 20, ratchet 21 and winding shaft 15 all move in unison. The camera includes a take-up chamber 22 which may be equipped with a film-guiding spring 23 to guide the film "F" into spiral convolutions 24 as it is propelled from the supply to the take-up chamber. I have found a spiral spring generally desirable, although with a reasonably large take-up chamber, as shown, the normal curl of the film tends to wind up satisfactorily without the spring.

From Fig. 4 it will be noticed that the film "F" has a series of aligned apertures A-1, A-2, A-3, etc.; these aligned apertures being equal in number to the number of exposures, as, for instance, 20 exposures. There is also an offset aperture "O" which is out of alignment with the aligned apertures "A," or which may be a continuation of an aperture "A," so that at least a portion of the aperture will lie out of alignment with the apertures "A." When the film cartridge is introduced into the camera, I prefer to turn the knob 18, propelling the film end "E" through the guideways 10 and 11, past the film gate 6, into the take-up chamber 22, and to continue this winding movement until the film comes to an automatic stop when it is substantially unwound from the film spool 14. To accomplish this, the following mechanism is used.

On an inside camera wall 30, there is a stud 31 loosely engaging an aperture in a film-engaging lever 32. This lever may swing back and forth in a direction substantially parallel to the plane of the film "F" in the film gate, but because of the loose connection between the stud 31 and lever 32, it may also move to and from the film a comparatively short distance. This film-engaging lever has an arm 34 carrying a beveled lug 35 which constitutes a stop lug, a beveled lug 36, which constitutes a lug for engaging the aligned apertures A-1, etc., and an intermediate lug 37 for a purpose which will be fully described hereinafter. The film-engaging lever 32 also has an arm 38 which may pass down through an aperture 39 in a pawl 40. Thus, the aperture 39 and arm 38 constitute connections by which the film-engaging lever 32 and the pawl 40 may move in unison.

Figure 2:
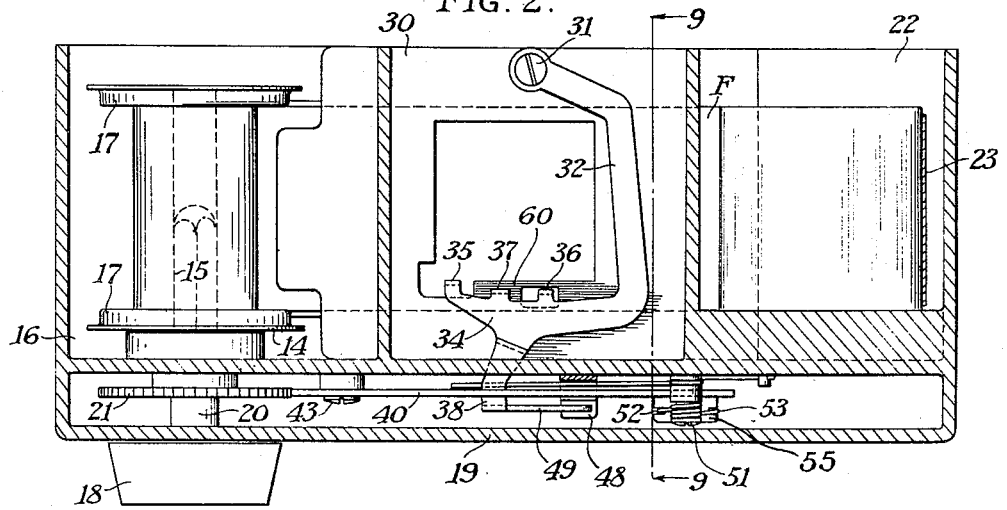
Fig. 2 is a transverse section through the camera shown in Fig. 1 taken on line 2—2 of Fig. 1, certain parts being shown in elevation.

Referring to Fig. 3, the pawl 40 is movably mounted on the camera wall 41 through slots 42 passing about studs 43 carried by the wall 41. In Fig. 3 the pawl is shown in its neutral position in which position both the pawl point 44 and the pawl point 45 lie out of engagement with the teeth 46 of the ratchet 21. Thus, in this position, the knob 18 may be freely turned and, as will be evident, as the film "F" is wound into the take-up chamber 22, the winding movement may continue freely until the offset aperture "O" comes opposite the beveled lug 35, at which time the straight side of the beveled lug may drop into the aperture "O," as shown in Fig. 5. When the aperture "O" reaches the beveled lug 35, it will swing the film-engaging lever to the right, with respect to Fig. 2; this movement causing the pawl 40 to move to the right until pawl point 44 engages a tooth 46, thereby immediately stopping the winding movement of the knob 18 and the film "F." The film has now been completely unwound and is ready to be rewound for making exposures one at a time as the film is returned to the original film cartridge. Pressure on push-button 48 cannot move lug 35 from aperture "O" because push-button 48 presses on an arm 49 offset to one side of pivot 31, so that the only winding that can now be accomplished with knob 18 is in a reverse direction. The offset arm 49 tends to rock lever 32 on stud 31 in a direction to raise beveled lug 36 pushing lug 35 down as lever 32 tends to rock on the fulcrum lug 37. A spring 50 encircles a stud 51 and includes the arms 52 and 53 which pass about a pin or stud 54. Each of these spring arms presses against a lug 55 on the pawl 40 and, consequently, if moved to the left, pawl 40 is moved to the right by spring arm 52, and if it has been moved to the right, the pawl 40 is moved to the left to a neutral position by the spring arm 53. In any event, when the presser member 48 is released, the camera may be wound for the first or second, or successive, exposures by turning the knob 18 in a direction to wind film on the film spool 14. This winding may continue until the beveled lug 36 is engaged by an aperture A-1, or the like, and this aperture causes the film-engaging lever 32 to move to the left with respect to Fig. 2, thereby also moving the pawl 40 so that the pawl point 43 may engage a tooth 46 and halt the winding movement when the film is positioned for the next exposure.

The intermediate lug 37, as shown in Fig. 5, has two functions; one of which is that it may form a fulcrum about which the beveled lugs 35 and 36 may swing when this lug is in contact with a support 60. This support may be formed on the camera body, or exposure frame, or in any suitable place. By contacting with the support 60, the lug 37 controls the degree of penetration of a lug 35 or 36 in an aperture "O" or A-1, or the like. This is useful because if the lug 35 or 36 should penetrate so far through the film that the beveled edge would be entirely through the film, the film could not be drawn past the lug in either direction. However, since the bevel never passes completely through the aperture, the lugs 35 and 36 are only engaged in the aperture and stop the movement of the film when the straight side of the lug engages an edge of the aperture. Thus, the intermediate lug 37 controls this penetration into the apertures and is useful for that purpose. However, it would be possible to limit the movement of the beveled lugs into the apertures by providing a plate behind the film if this should be necessary. There is a second and more important reason for the lug 37 and, that is, that when a film does not lie in the film gate 6, it is desirable to hold the beveled lug 35 away from the film plane so that the film may be entered and passed through the film gate and passed to lug 36 which will rock the film-engaging lever 32 so that the tip of the lug 35 may contact with the film. This contact may be continued as the film is unwound and until the aperture "O," which is the stop aperture, engages the lug 35 as indicated in Fig. 5. Thus, lug 35 and aperture "O" cooperate to halt the unwinding of the film, but, on the other hand, the intermediate lug 37 will hold lug 35 out of the path of the film except when the film is engaged by beveled lug 36 because of the action of a spring 61, best shown in Figs. 3 and 8. This spring, pressing on the offset arm 38 of the film-engaging lever 32, tends to rock the lever about the intermediate lug 37, thereby holding the lug 35 away from the film plane. This spring action is, of course, overcome as soon as the film strikes the beveled edge of lug 36 camming this lug outwardly until both lugs engage the film, as shown in Fig. 7. Thus, Fig. 7 shows the position of the film-engaging lever as the film is wound in either direction and the winding will cease as soon as the offset aperture "O" or an aperture A-1 reaches the beveled lug 35, or the beveled lug 36. Lug 36, therefore, has the important function of holding the film-engaging lever 32 in the correct position automatically to enable the film to be wound into the take-up chamber before exposure.

The operation of this camera is extremely simple. A film cartridge 14 is placed on a polygonal driving post 15 by moving the film cartridge axially into the supply spool chamber 9. The knob 18 is then rotated in a direction to propel the film "F" into the take-up chamber 22. Since the lug 35 is held away from the film plane as the end of the film "E" enters the exposure frame, it does not catch on the end of the film and stop it from moving, but permits it to pass. As the film passes and engages the beveled lug 36, the take-up lever 32 is rocked about its loose connection with the stud 31 so that both lugs 35 and 36 engage the film as shown in Fig. 7. Each time an aperture A-1, A-2, or the like, passes the beveled lug 36, the beveled lug will drop a short distance into the aperture but will immediately move out because of the beveled surface of the lug. Unwinding continues until the beveled lug 35 enters the aperture "O" and the straight side of this beveled lug engages the edge of the aperture "O" and is moved by it to move the pawl 40 so as to engage the pawl point 44 with the ratchet 46, stopping the unwinding movement of the film. The film is now positioned for exposure. Turning the knob 18 a reverse direction is the only movement that can now be accomplished as pawl 35 cannot be now raised by push-bottom 48. The film may be wound in a reverse direction until lug 36 engages an aperture A-1 with the straight side of the lug engaging the aperture so that the film will move the lever 32 a short distance and will move the pawl 40 to engage pawl point 43 with the tooth 46. An area of film is then ready for exposure and, after exposure, the push-button 48 may be depressed. Depressing this push-button causes the spring 50 to restore the pawl to its neutral position of Fig. 3 and, of course, being operably connected to the film-engaging lever 32, this lever is likewise moved to an inactive position with the lugs in the relative position of Fig. 7. Thus, an operator merely turns the knob 18 intermittently as permitted by the automatic stopping mechanism until all the exposures are made and after the last aperture A—X is passed, the knob can continue to turn until the film is fully wound on the spool 14. It can then be removed from the camera.

It should be noted that our mechanism causes the unwinding movement of the film to definitely control movement of the winding knob 18, because when the stop lug 35 once enters the stop aperture "O," no further movement in the unwinding direction may take place. The lug 35 cannot be removed from aperture "O" at this point by push-button 48. Any attempt to again rotate the knob 18 in an unwinding direction will again cause the pawl point 44 to engage the ratchet wheel 21 and thereby latch the knob 18 against movement. Reverse movement can take place because of the beveled edge of lug 35, which, as shown in Fig. 5, can ride over the edge of notch "O."

While we have described a preferred embodiment of our invention and one which is well adapted to form a practical film-winding control for cameras, it is obvious that variations will readily occur to those skilled in the art. We consider as within the scope of our invention all such forms as may come within the scope of the appended claims.

Having thus described our invention, what we claim is new and desire to secure by Letters Patent of the United States is:

1. A film winding control for cameras of the type employing apertured roll film and a film moving knob for moving film in both directions through a camera from a supply to a take-up chamber and back, said film including spaced aligned apertures, one for each exposure and a stop aperture offset from the aligned apertures, said control comprising, in combination, a ratchet on the knob and movable therewith, a movable pawl carrying two points engageable with the ratchet, one at a time, to prevent rotation of the ratchet in either direction according to the position of the pawl, said pawl having a neutral position with both pawl points out of engagement with the ratchet, a film engaging lever connected to the pawl for operating the pawl when the knob is turned and a film aperture moves the film engaging lever in one direction to engage a pawl point with the ratchet halting movement of knob and the film.

2. A film winding control for cameras of the type employing apertured roll film and a film moving knob for moving film in both directions through a camera from a supply to a take-up chamber and back, said film including spaced aligned apertures, one for each exposure and a stop aperture offset from the aligned apertures, said control comprising, in combination, a ratchet on the knob and movable therewith, a movable pawl carrying two points engageable with the ratchet, one at a time, to prevent rotation of the ratchet in either direction according to the position of the pawl, said pawl having a neutral position with both pawl points out of engagement with the ratchet, a film engaging lever connected to the pawl for operating the pawl when the knob is turned and a film aperture moves the film engaging lever in one direction to engage a pawl point with the ratchet halting movement of knob and the film, and means for moving the film engaging lever from a film aperture.

3. A film winding control for cameras of the type employing apertured roll film and a film moving knob for moving film in both directions through a camera from a supply to a take-up chamber and back, said film including spaced aligned apertures, one for each exposure and a stop aperture offset from the aligned apertures, said control comprising, in combination, a ratchet on the knob and movable therewith, a movable pawl carrying two points engageable with the ratchet, one at a time, to prevent rotation of the ratchet in either direction according to the position of the pawl, said pawl having a neutral position with both pawl points out of engagement with the ratchet, a film engaging lever connected to the pawl for operating the pawl when the knob is turned and a film aperture moves the film engaging lever in one direction to engage a pawl point with the ratchet halting movement of knob and the film, and means for moving the film engaging lever from a film aperture, and a spring means for moving the pawl to its neutral position when the film engaging lever is moved from the film aperture.

4. A film winding control for cameras of the type employing apertured roll film and a film moving knob for moving film in both directions through a camera from a supply to a take-up chamber and back, said film including spaced aligned apertures, one for each exposure and a stop aperture offset from the aligned apertures, said control comprising, in combination, a ratchet on the knob and movable therewith, a movable pawl carrying two points engageable with the ratchet, one at a time, to prevent rotation of the ratchet in either direction according to the position of the pawl, said pawl having a neutral position with both pawl points out of engagement with the ratchet, a film engaging lever connected to the pawl for operating the pawl when the knob is turned and a film aperture moves the film engaging lever in one direction to engage a pawl point with the ratchet halting movement of knob and the film, and means for moving the film engaging lever from a film aperture, and spring means tending to hold the film engaging lever in its neutral position.

5. A film winding control for cameras of the type employing apertured roll film and a film moving knob for moving film in both directions through a camera from a supply to a take-up chamber and back, said film including spaced aligned apertures, one for each exposure and a stop aperture offset from the aligned apertures, said control comprising, in combination, a ratchet on the knob and movable therewith, a movable pawl carrying two points engageable with the ratchet, one at a time, to prevent rotation of the ratchet in either direction according to the position of the pawl, said pawl having a neutral position with both pawl points out of engagement with the ratchet, a film engaging lever connected to the pawl for operating the pawl, a pair of beveled lugs carried by the film engaging lever beveled in opposite directions, one for engaging the aligned apertures and the other for engaging the stop aperture of the film, a spring means tending to hold the film engaging lever in an inactive position in which both beveled lugs lie out of engagement with the film apertures when the pawl lies in a neutral position, said film being movable by the knob to engage a film aperture with a beveled lug and move the film engaging lever and pawl until said pawl is moved to engage the ratchet and stop movement of the knob and film.

6. A film winding control for cameras of the type employing apertured roll film and a film moving knob for moving film in both directions through a camera from a supply to a take-up chamber and back, said film including spaced aligned apertures, one for each exposure and a stop aperture offset from the aligned apertures, said control comprising, in combination, a ratchet on the knob and movable therewith, a movable pawl carrying two points engageable with the ratchet, one at a time, to prevent rotation of the ratchet in either direction according to the position of the pawl, said pawl having a neutral position with both pawl points out of engagement with the ratchet, a film engaging lever connected to the pawl for operating the pawl, a pair of beveled lugs carried by the film engaging lever beveled in opposite directions, one for engaging the aligned apertures and the other for engaging the stop aperture of the film, a spring means tending to hold the film engaging lever in an inactive position in which both beveled lugs lie out of engagement with the film apertures when the pawl lies in a neutral position, said film being movable by the knob to engage a beveled lug with a film aperture and move the film engaging lever and pawl until said pawl is moved to engage the ratchet and stop movement of the knob and film, a release for removing a beveled lug from a film aperture whereby said spring means may move the film engaging lever to its inactive position.

7. The film winding control defined in claim 4 characterized by the film engaging lever being mounted for movement in a plane substantially parallel with the plane of the film.

8. A film winding control for cameras of the type employing apertured roll film and a film moving knob for moving film in both directions through a camera from a supply to a take-up chamber and back, said film including spaced aligned apertures, one for each exposure and a stop aperture offset from the aligned apertures, said control comprising, in combination, a ratchet on the knob and movable therewith, a movable pawl having a neutral position out of engagement with the ratchet and two operative positions for engaging the ratchet to prevent movement of the ratchet in either of two directions, a film engaging lever mounted to move with the film and to move to and from the film, a pair of oppositely beveled lugs on the film engaging lever, one for engaging the aligned apertures and the other for engaging the stop aperture, connections for operating the pawl and film engaging lever together, whereby a beveled lug through engagement with a film aperture may be moved by the film to engage the pawl with the ratchet to prevent movement thereof.

9. A film winding control for cameras of the type employing apertured roll film and a film moving knob for moving film in both directions through a camera from a supply to a take-up chamber and back, said film including spaced aligned apertures, one for each exposure and a stop aperture offset from the aligned apertures, said control comprising, in combination, a ratchet on the knob and movable therewith, a movable pawl having a neutral position out of engagement with the ratchet and two operative positions for engaging the ratchet to prevent movement of the ratchet in either of two directions, a film engaging lever pivotally mounted for a swinging movement generally parallel to the plane of the film and mounted to move with the film and to move to and from the film, the pivotal mount comprising a stud and aperture of loose fit to permit movement to and from the film, a pair of oppositely beveled lugs on the film engaging lever, one for engaging the aligned apertures and the other for engaging the stop aperture, connections for operating the pawl and film engaging lever together, whereby a beveled lug through engagement with a film aperture may be moved by the film to engage the pawl with the ratchet to prevent movement thereof.

10. A film winding control for cameras of the type employing apertured roll film and a film moving knob for moving film in both directions through a camera from a supply to a take-up chamber and back, said film including spaced aligned apertures, one for each exposure and a stop aperture offset from the aligned apertures, said control comprising, in combination, a ratchet on the knob and movable therewith, a movable pawl carrying two points engageable with the ratchet, one at a time, to prevent rotation of the ratchet in either direction according to the position of the pawl, said pawl having a neutral position with both pawl points out of engagement with the ratchet, a film engaging lever connected to the pawl for operating the pawl when the knob is turned and a film aperture moves the film engaging lever in one direction to engage a pawl point with the ratchet halting movement of knob and the film, the film engaging lever including a pair of spaced oppositely beveled lugs, one for engaging the aligned apertures and the other for engaging the stop aperture, a spring tending to press a lug into a film aperture, means for moving a lug out of a film aperture, and an intermediate lug positioned between the beveled lugs for limiting the penetration of a beveled lug into a film aperture.

11. A film winding control for cameras of the type employing apertured roll film and a film moving knob for moving film in both directions through a camera from a supply to a take-up chamber and back, said film including spaced aligned apertures, one for each exposure and a stop aperture offset from the aligned apertures, said control comprising, in combination, a ratchet on the knob and movable therewith, a movable pawl carrying two points engageable with the ratchet, one at a time, to prevent rotation of the ratchet in either direction according to the position of the pawl, said pawl having a neutral position with both pawl points out of engagement with the ratchet, a film engaging lever connected to the pawl for operating the pawl when the knob is turned and a film aperture moves the film engaging lever in one direction to engage a pawl point with the ratchet halting movement of knob and the film, the film engaging lever including a pair of spaced oppositely beveled lugs, one for engaging the aligned apertures and the other for engaging the stop aperture, a spring tending to press a lug into a film aperture, means for moving a lug out of a film aperture, and an intermediate lug positioned between the beveled lugs, a support over which the intermediate lug may move, and a spring tending to turn the film engaging lever about the intermediate lug in one direction whereby the beveled lug for engaging the stop aperture may be held away from the film plane when film is not engaging the beveled lugs.

12. A film winding control for cameras of the type employing apertured roll film and a film moving knob for moving film in both directions through a camera from a supply to a take-up chamber and back, said film including spaced aligned apertures, one for each exposure and a stop aperture offset from the aligned apertures, said control comprising, in combination, a ratchet on the knob and movable therewith, a movable pawl carrying two points engageable with the ratchet, one at a time, to prevent rotation of the ratchet in either direction according to the position of the pawl, said pawl having a neutral position with both pawl points out of engagement with the ratchet, a film engaging lever connected to the pawl for operating the pawl when the knob is turned and a film aperture moves the film engaging lever in one direction to engage a pawl point with the ratchet halting movement of knob and the film, the film engaging lever including a pair of spaced oppositely beveled lugs, one for engaging the aligned apertures and the other for engaging the stop aperture, a spring tending to press a lug into a film aperture, means for moving a lug out of a film aperture, and an intermediate lug positioned between the beveled lugs, a support over which the intermediate lug may move, and a spring tending to press the film engaging lever towards a film with the beveled lugs in engagement with the film and to move a beveled lug into an aperture when an aperture is moved to a beveled lug, said intermediate lug limiting inward movement of a lug into a film aperture.

13. A film winding control for cameras of the type employing apertured roll film and a film moving knob for moving film in both directions through a camera from a supply to a take-up chamber and back, said film including spaced aligned apertures, one for each exposure and a stop aperture offset from the aligned apertures, said control comprising, in combination, a ratchet on the knob and movable therewith, a movable pawl carrying two points engageable with the ratchet, one at a time, to prevent rotation of the ratchet in either direction according to the position of the pawl, said pawl having a neutral position with both pawl points out of engagement with the ratchet, a film engaging lever connected to the pawl for operating the pawl when the knob is turned and a film aperture moves the film engaging lever in one direction to engage a pawl point with the ratchet halting movement of knob and the film, the film engaging lever including a pair of spaced oppositely beveled lugs, one for engaging the aligned apertures and the other for engaging the stop aperture, a spring tending to press a lug into a film aperture, means for moving a lug out of a film aperture, and an intermediate lug positioned between the beveled lugs for limiting the penetration of a beveled lug into a film aperture, the beveled lugs having a straight edge adapted to engage a film aperture and stop film movement by engaging the pawl and ratchet, said beveled surface being adapted to ride over a film aperture without stopping film movement.

14. A film winding control for cameras of the type employing apertured roll film and a film moving knob for moving film in both directions through a camera from a supply to a take-up chamber and back, said film including spaced aligned apertures, one for each exposure and a stop aperture offset from the aligned apertures, said control comprising, in combination, a ratchet on the knob and movable therewith, a movable pawl carrying two points engageable with the ratchet, one at a time, to prevent rotation of the ratchet in either direction according to the position of the pawl, said pawl having a neutral position with both pawl points out of engagement with the ratchet, a film engaging lever connected to the pawl for operating the pawl when the knob is turned and a film aperture moves the film engaging lever in one direction to engage a pawl point with the ratchet halting movement of knob and the film, the film engaging lever including a pair of spaced oppositely beveled lugs, one for engaging the aligned apertures and the other for engaging the stop aperture, a spring tending to press a lug into a film aperture, means for moving a lug out of a film aperture, and an intermediate lug positioned between the beveled lugs for limiting the penetration of a beveled lug into a film aperture, the beveled lugs having a straight edge adapted to engage a film aperture and stop film movement by engaging the pawl and ratchet, said beveled surface being adapted to ride over a film aperture without stopping film movement, a support on which the intermediate lug may ride, a spring tending to hold the beveled lug engageable with the stop aperture out of the film path until a film entering the film path rocks the film engaging lever and the lug adapted to engage the aligned apertures whereby film may be moved through the camera until the first-mentioned beveled lug is reached by the stop aperture of the film.

15. A film-winding control for cameras using roll film having a film spool, a stop perforation carried by the film and spaced from the core a predetermined distance, aligned perforations out of alignment with the stop perforation and positioned one for each exposure, said camera including a winding knob for unwinding and winding up film, said film-winding control comprising a ratchet wheel movable with the winding knob, a pair of movable pawl points adapted to move to and from the ratchet to prevent winding thereof when in engagement therewith, one point in one direction and the other point in an opposite direction, said ratchet points being movable by the aligned perforations in the film, one ratchet point being movable by the stop perforation to prevent further unwinding of the film, the other ratchet point being movable in the other direction by an aligned perforation to halt movement of the film for an exposure, and a means for releasing the last-named ratchet point from an aligned film perforation.

16. A film-winding control for cameras using roll film having a film spool, a stop perforation carried by the film and spaced from the core a predetermined distance, aligned perforations out of alignment with the stop perforation and positioned one for each exposure, said camera including a winding knob for unwinding and winding up film, said film-winding control comprising a ratchet wheel movable with the winding knob, a pair of movable pawl points adapted to move to and from the ratchet to prevent winding thereof when in engagement therewith, one point in one direction and the other point in an opposite direction, said ratchet points being movable by the aligned perforations in the film, one ratchet point being movable by the stop perforation to prevent further unwinding of the film, the other ratchet point being movable in the other direction by an aligned perforation to halt movement of the film for an exposure, and a means for releasing the last-named ratchet point from an aligned film perforation, a beveled edge on the pawl point engaging the stop perforation, said beveled edge riding out of the stop perforation when said film is rewound toward the film spool hub.

17. The film-winding control for cameras defined in claim 16 characterized in that the means for releasing the pawl point from an aligned aperture at an exposure area cannot release the pawl point moved by the stop aperture from the stop aperture.

JOSEPH MIHALYI.
CLARENCE W. PRIBUS.
HERBERT A. BING.

REFERENCES CITED

The following references are of record in the file of this patent:

UNITED STATES PATENTS

| Number | Name | Date |
|---|---|---|
| 1,386,733 | Rosen et al. | Aug. 9, 1921 |
| 1,879,866 | Aschenbrenner | Sept. 27, 1932 |
| 2,360,255 | Mihalyi | Oct. 10, 1944 |